June 10, 1930.  W. J. RUDOLPH  1,762,487
AIR VALVE
Filed Jan. 30, 1926
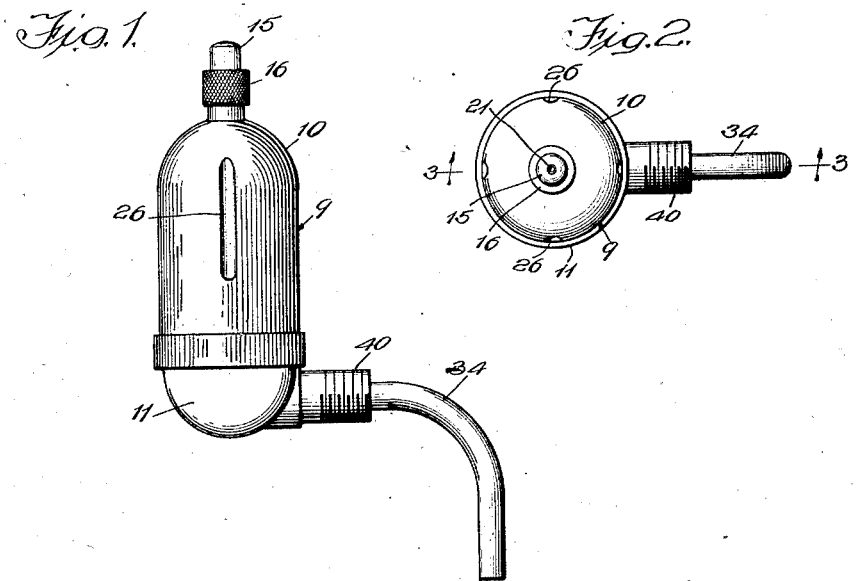
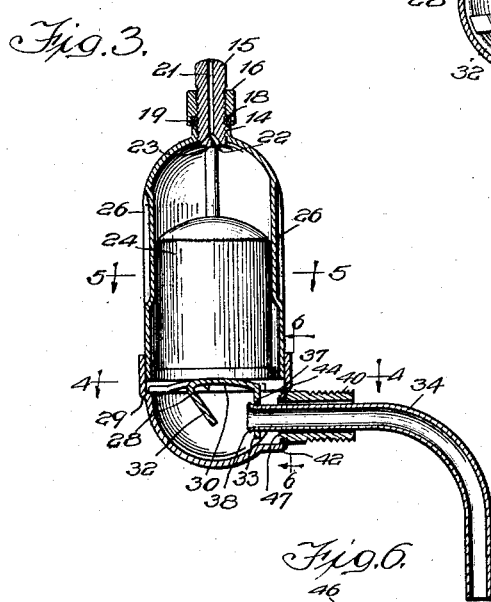
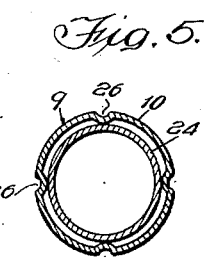
Witnesses:
William R. Kilroy
Harry R. LeWhite
Inventor
Walter J. Rudolph
Hill & Hill Patented June 10, 1930

1,762,487

UNITED STATES PATENT OFFICE

WALTER J. RUDOLPH, OF CHICAGO, ILLINOIS, ASSIGNOR TO JAS. P. MARSH & COMPANY, OF CHICAGO, ILLINOIS, A CORPORATION OF ILLINOIS

AIR VALVE

Application filed January 30, 1926. Serial No. 84,888.

My invention relates to air valves and particularly to air valves for steam heating systems.

The invention has among its other objects the production of devices of the kind described, which are simple in construction, convenient, compact, durable, efficient and satisfactory for use wherever found applicable.

Particular objects of the invention are to provide devices of the kind described which have improved means for preventing leakage of steam therefrom; which have improved means for guiding the floats thereof; which have improved means for mounting them upon radiators or the like; which have improved means for loosely holding tubes projecting from them, and which have improved means for supporting the floats thereof.

Many other objects and advantages of the construction herein shown and described will be obvious to those skilled in the art from the dislosure herein given.

To this end my invention consists in the novel construction, arrangement and combination of parts herein shown and described, and more particularly pointed out in the claims.

In the drawings, wherein like reference characters indicate like or corresponding parts:

Fig. 1 is an elevation of an air valve embodying the invention;

Fig. 2 is a plan view of the improved valve;

Fig. 3 is a section taken on line 3—3 of Fig. 2;

Fig. 4 is a section taken on line 4—4 of Fig. 3;

Fig. 5 is a section taken on line 5—5 of Fig. 3; and

Fig. 6 is a section taken on line 6—6 of Fig. 3.

In the drawing I have shown a preferred form of the invention embodied in any air valve adapted to be used in steam heating systems or the equivalent, valves of this character being generally mounted upon radiators forming parts of such systems. The improved valve preferably comprises a housing 9 formed of a shell 10 closed at its lower end by a cap 11. The shell 10 is preferably provided with an aperture 14 at its upper end into which a tubular member 15 is screw-threaded, a knurled nut 16 screw-threaded upon the tubular member being adapted to lock it in a plurality of adjusted positions upon the shell. The nut 16 is preferably provided with an annular recess 18 adapted to accommodate packing 19 which may be formed of any suitable material, but is preferably a ring of relatively soft metal. When the nut 16 is manipulated to lock the tubular member 15 in an adjusted position upon the shell 10, the packing 19 engages the shell and is slightly compressed to seal the joint between the shell and the tubular member.

The passage extending through the tubular member 15 is designated by the reference character 21 and is provided with a valve seat 22 at its lower end. A valve 23 carried by a float 24 is adapted to engage the valve seat 22 to close the passage 21. The float 24 is substantially cylindrical in form and preferably contains a quantity of volatile liquid which will expand when steam enters the shell 10 and cause the valve 23 to engage the valve seat 22. The float 24 is free to move longitudinally in the shell 10 but is preferably guided in this movement by inwardly projecting ribs 26 formed integral with the shell. A stamping or member 28 disposed in the cap 11 normally supports the float 24 and is itself supported upon an annular shoulder 29 formed in the cap. As best shown in Fig. 3, the member 28 is formed with an upwardly extending arcuate portion 30 upon which the float 24 is adapted to rest, the float 24 being preferably formed with a flat or slightly concave bottom. This construction insures that the float will not adhere to the member 28 and that it will float into a position wherein the valve 23 engages the valve seat 22 when an undesirable amount of water accumulates within the shell. Lugs 32 and 33 formed integral with the member 28 and depending therefrom are provided for loosely holding a tube 34 in its correct position, the tube 34 passing through an aperture 37 formed in the lug 33 and being provided with an enlarged or expanded head 38 at its inner end to prevent its withdrawal from the member 28. The lug 32 is adapted to limit inward displacement of the tube 34 so that the tube cannot be pushed into the cap a sufficient distance to wedge it between the member 28 and the cap. This construction insures that the tube 34 will assume its correct position when inserted in a radiator as the tube loosely fits the aperture 37.

The tube 34 projects through a screw-threaded nipple 40 projecting from the cap 11, the nipple 40 being adapted to be threaded into the wall or a radiator or the like to mount the improved valve upon the radiator. The external diameter of the tube 34 is preferably less than the internal diameter of the nipple 40, this construction permitting the tube 34 to discharge water from the casing even though the casing is sealed at the top and steam is entering the casing through the nipple 40.

The nipple 40 is preferably provided with a portion 42 of reduced diameter adapted to seat in an aperture 44 formed in the cap 11, the portion 42 being flattened as at 45 to engage a flattened portion 46 of the wall of the aperture. This prevents the nipple 40 from rotating relative to the cap. In practice, I preferably rivet over the inner end of the portion 42, as indicated at 47, so that the nipple is rigidly secured to the cap.

Briefly, the operation of the above described device is substantially as follows: Assuming that the improved valve is mounted upon a radiator in the usual manner and that steam is permitted to enter the radiator, the steam will cause the air in the radiator to flow into the improved device by way of the nipple 40. This air discharges through the passage 21. After the air has been discharged from the radiator, steam enters the casing and causes the volatile liquid in the float 24 to expand, whereupon the valve 23 engages the valve seat 22 and closes the passage 21. Also, if water enters the casing, the float rises and seals the valve 23, thus preventing water from escaping into the room.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A device of the class described including a housing, a float therein, a member stamped from metal and having an upwardly extending arcuate portion to normally support said float, means for supporting said member in the housing, spaced lugs integral with said member, one of said lugs having an aperture, and a tube loosely mounted in said aperture with its inner end adapted for abutting engagement with the other lug to limit the sliding movement of said tube.

2. A device of the class described including a housing, a float therein, a member stamped from metal and having an upwardly extending arcuate portion to normally support said float, means for supporting said member in the housing, a tube having one end positioned beneath said member, and spaced lugs formed integral with said member to guide and limit the movement of the tube.

3. A device of the class described including a housing, a float, a member stamped from metal and positioned within the housing to normally support said float, means for supporting said member in the housing, spaced lugs integral with and depending from said member, one of said lugs having an aperture, and a tube loosely mounted in said aperture with its inner end adapted for abutting engagement with the other lug to limit the sliding movement of said tube.

4. A device of the class described including a housing, a float therein, a member stamped from metal and having an upwardly bulged arcuate portion to normally support said float, means for supporting said member in the housing, spaced lugs integral with the member and dependent therefrom, one of said lugs having an aperture, and a tube loosely mounted in said aperture with its inner end expanded to limit the movement of the tube in one direction and the expanded end of said tube being adapted for abutting engagement with the other lug to limit sliding movement of the tube in the other direction.

5. A device of the class described including a housing, a float therein, a member stamped from metal and having an upwardly extending arcuate portion to normally support said float, means for supporting said member in the housing, a tube having one end positioned beneath said member, spaced lugs formed integral with said member to guide and limit the movement of the tube, and a nipple for attaching said device to a radiator, said nipple having means for preventing rotation of said device relative thereto.

6. In a device of the class described, the combination of a housing, a cap closing one end of said housing, said cap having a fluid inlet and outlet, a float located in said housing, a float support arranged between and supported by said housing and cap, said float support having openings permitting fluid to pass and having a support for supporting a tube which communicates with the interior of said cap.

7. In a device of the class described, the combination of a housing, a cap closing one end of said housing, said cap having a fluid opening, a float located in said housing, a float support arranged for support between the cap and housing above the fluid opening, said support having means for limiting movement of a tube associated with the cap and having openings whereby fluid may pass from one to the other of said cap and housing.

8. A member adapted to be associated with a valve having a float, said member having elements whereby said device may engage the housing for said float to support said member relatively to said housing, said member having openings through which liquid may pass and having means providing a support for a tube which extends from said housing and having means for limiting the inward movement of said tube relatively to said housing.

9. A device of the class described including a cup shaped base having an interior shoulder, a plate resting upon said shoulder, a downwardly depending part on the plate, having an opening, and a tube mounted in the opening with its inner end flanged outwardly to prevent withdrawal of said tube.

10. A device of the class described including a cup-shaped base having an interior shoulder, a plate resting upon said shoulder, downwardly depending spaced parts on the plate, one of said parts having an opening, a tube mounted in the opening with its inner end flanged outwardly to limit the outward movement of the tube, the other depending part forming a stop for limiting movement of the tube in the other direction.

11. A device of the class described including a cup-shaped base having an interior shoulder, a plate resting upon said shoulder and having its central portion arched, a downwardly depending part on the plate, having an opening, and a tube mounted in the opening with its inner end flanged outwardly to limit outward movement of said tube.

In testimony whereof, I have hereunto signed my name.

WALTER J. RUDOLPH.